United States Patent [19]

Watson

[11] Patent Number: 4,625,235

[45] Date of Patent: Nov. 25, 1986

[54] REMOTE CONTROL SWITCHING OF TELEVISION SOURCES

[75] Inventor: John N. Watson, Moorestown, N.J.

[73] Assignee: Westinghouse Electric Corp., Pittsburgh, Pa.

[21] Appl. No.: 496,023

[22] Filed: May 19, 1983

[51] Int. Cl.⁴ .......................... H04N 7/10; H04N 7/08
[52] U.S. Cl. ........................................ 358/86; 455/4; 455/12; 358/147
[58] Field of Search .................. 358/86, 147; 455/3-6, 455/12

[56] References Cited

U.S. PATENT DOCUMENTS 4,329,675  5/1982  Van Hulle .............................. 358/86
4,388,645  6/1983  Cox et al. ............................. 358/147
4,404,589  9/1983  Wright, Jr. ............................ 358/86

FOREIGN PATENT DOCUMENTS

81/02961 10/1981 PCT Int'l Appl. ................. 358/147

OTHER PUBLICATIONS

McClannan et al, "A Satellite System for CATV", *Proceedings of the IEEE*, vol. 58, No. 7, Jul. 1970, pp. 987–1001.

*Primary Examiner*—Keith E. George
*Attorney, Agent, or Firm*—M. P. Lynch

[57] ABSTRACT

In a satellite communications network wherein primary video signals containing address and command data pulses in the vertical blanking intervals are transmitted to a plurality of local television subscriber systems, each local system is provided with decoder/controller/switcher apparatus to extract the data from the signals and effect control of the programming provided to the local subscribers in response to the data.

20 Claims, 11 Drawing Figures

REMOTE CONTROL SWITCHING OF TELEVISION SOURCES

BACKGROUND OF THE INVENTION

The use of satellite distribution of television signals has introduced numerous opportunities and techniques for providing viewers with a wide variety of news, entertainment, educational and sports programming. Conceptually, a number of these opportunities require some means of accurately switching between different program sources and/or controlling local equipment at the satellite receive locations.

The 24 hour satellite news network represents one such situation wherein sources of news of a national, regional and local nature as well as regional and local commercial matter are each allocated time slots in a given hour of programming thus requiring the appropriate switching and machine control capability at each local cable television system head end and the appropriate coordination of the various operations involved in producing and uplinking the news.

SUMMARY OF THE INVENTION

There is described herein with reference to the accompanying drawings a technique for implementing a switching concept wherein data inserted in the vertical blanking interval of a primary video signal transmission from a central uplinking facility is transmitted via satellite to a plurality of individiual local cable television systems.

In a satellite communications news network, for example, wherein each local cable system would receive signals from two transponders on the same satellite, one for national news and the other for regional news, the primary national news transmission from the central uplink would include encoded data which, when interpreted by a decoder/controller/switcher apparatus at the cable system, would control the switching of the cable channel between the national news, the regional news, and a number of other possible sources including local news produced by the cable system, video tape playback, and special news coverage on other transponders.

The decoder section of the decoder/controller/switcher apparatus located at each receive location separates and removes the data from the vertical blanking interval of the primary video signal to thereby make the data available for control and information purposes and to make the primary video signal (absent the data) available for subscriber viewing.

A microcomputer included in the decoder/controller/switcher apparatus responds to the data by effecting the appropriate switching among the primary and various secondary video and audio program inputs, as well as performing various control functions such as starting and stopping video tape machines, tuning receivers, and actuating alarms and status indicators.

By assigning a unique address to each decoder apparatus, commands and information can be transmitted specifically to one receive location. Commands addressed to other locations are ignored. There is also provision for group addressing, whereby a single command can be transmitted to all locations within a specific region, and for universal addressing, whereby a single command can be sent to all locations with the system.

In addition to transmitting data to effect the desired switching and control functions at the cable system location, commands that change the information stored in the decoder microcomputer memories can be transmitted. Also, text information and other forms of data can be transmitted from the central facility.

A typical national system would be subdivided into a plurality of regions with each local cable system being supplied with the same national primary news transmission and a regional news transmission produced specifically for that geographical region.

The producers of regional news uplink their signals from a variety of geographical locations. Each regional uplink would be provided with a receiver which feeds the primary signal to a decoder/controller/switcher apparatus at the regional uplink which is similar to those used by the cable systems. Because each decoder/controller/switcher has a unique address, special commands can be sent to each regional uplink, prompting it to power up and prompting it to power down. Coordinating the regional uplinks in this manner is important since different regional uplinks use the same regional transponder at different times and they must not double illuminate the transponder. After powering up, a regional uplink is also given an "on air" indication, meaning that the cable systems in that region are now switched to regional.

DESCRIPTION OF THE DRAWINGS

The invention will become more readily apparent from the following exemplary description in connection with the accompanying drawings.

Figure 1:
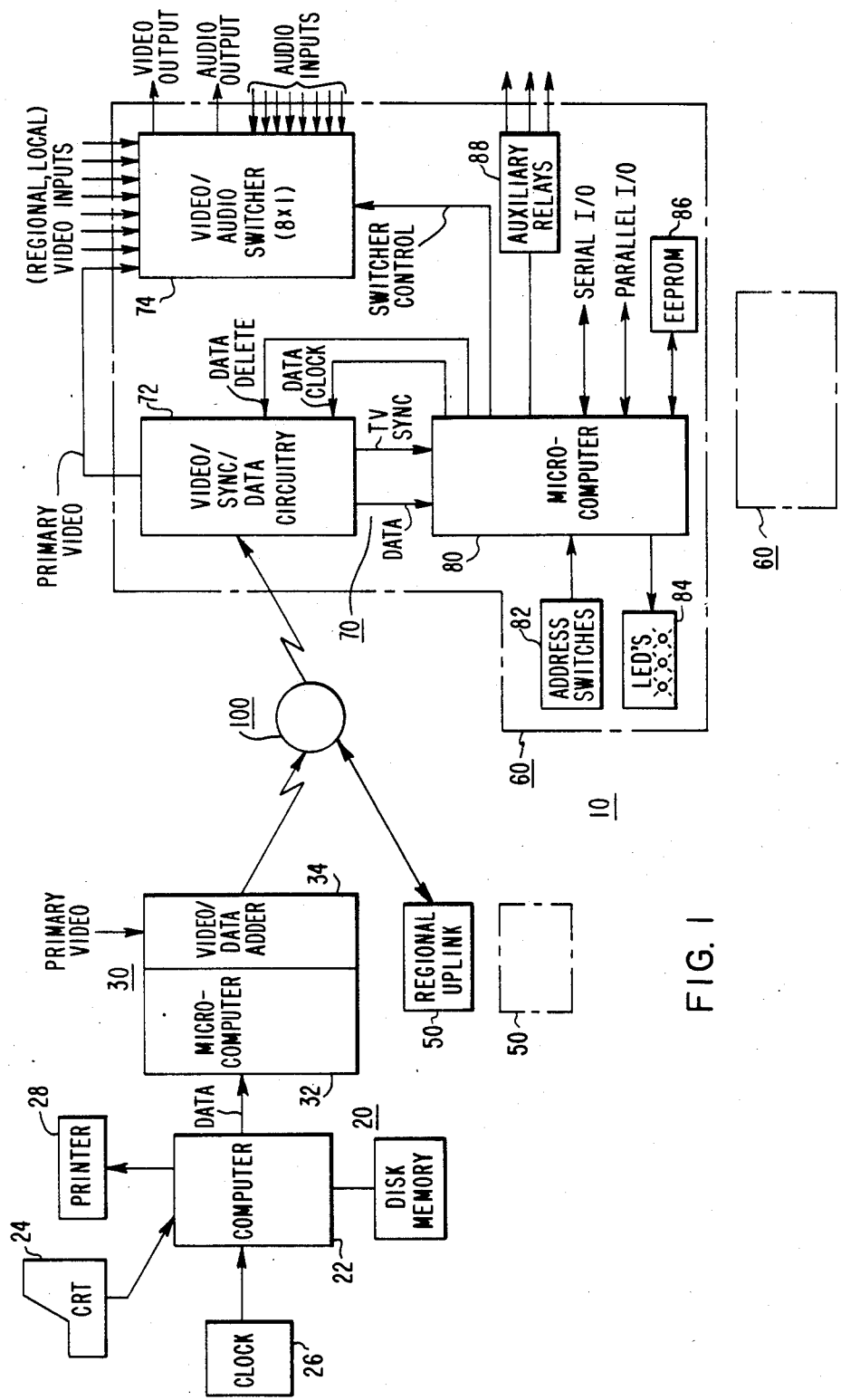
FIG. 1 is a block diagram schematic of a television system employing the novel encoder and decoder functions of the invention.
Figure 5A:
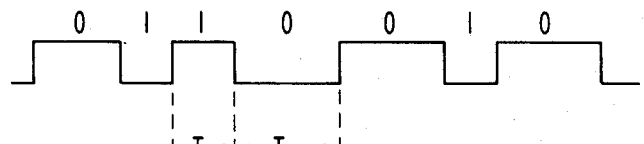
Figure 5B:
Figure 5C:
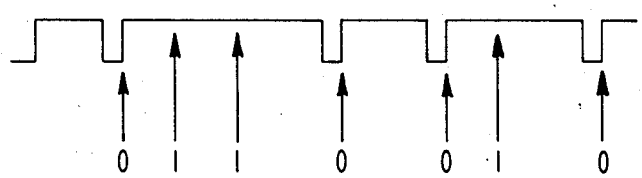
Figure 4A:
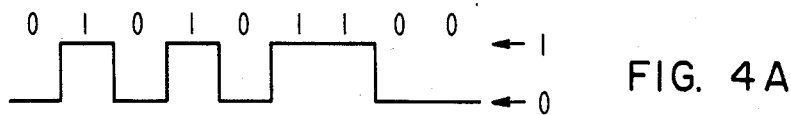
Figure 4B:
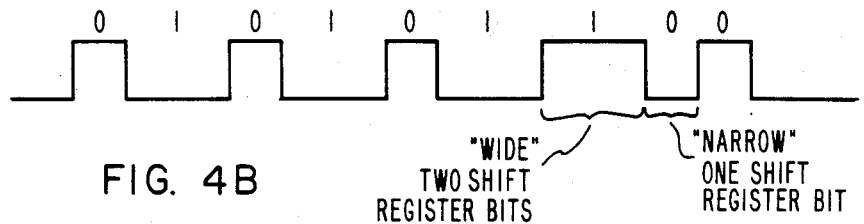
Figure 6A:
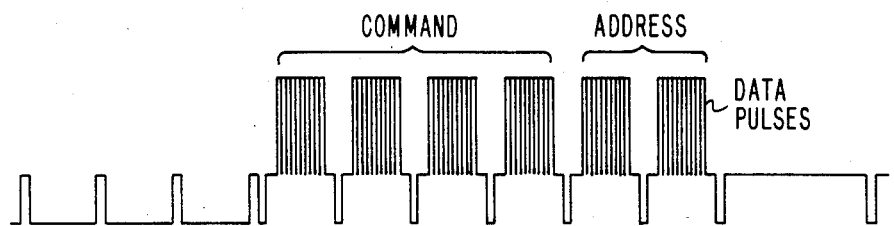
Figure 6B:
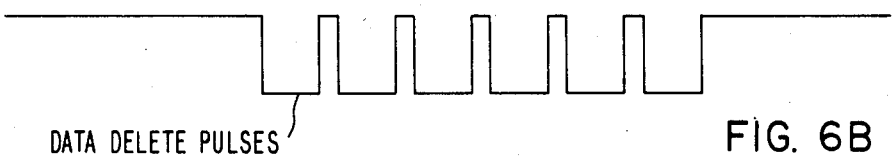
Figure 6C:
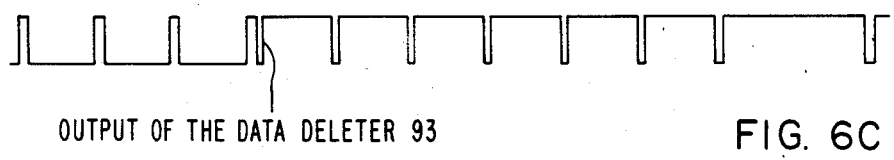

The waveforms of FIGS. 4A and 4B illustrate the pulse width modulation technique employed to insert the data and information in the vertical blanking intervals of the primary video signal by the encoder of FIG. 1;

The waveforms of FIGS. 5A, 5B and 5C illustrate the separation and processing of the transmitted data by the decoder; and The waveforms of FIGS. 6A, 6B and 6C illustrate the format of the encoded data information and the pulse waveforms for deleting the data information from the transmitted primary video signal.

DESCRIPTION OF THE PREFERRED EMBODIMENT

Referring to FIG. 1 there is illustrated a television system 10 comprised of a central transmitting facility 20 having an encoder 30, linked to several region uplink facilities 50 and a plurality of local television subscriber receive systems 60 each including a decoder 70. The communications link between the central facility 20 and the reginal uplink stations 50 and the local systems 60 may be realized through the use of a satellite communications link 100.

Data to be transmitted via the primary video signal to the respective decoders of the regional uplink stations 50 and the local systems 60 are scheduled using a PDP11/23 data processing computer 22. A CRT terminal 24 displays system status and is used for modifying or manually overriding the schedule and for entering special commands for immediate execution. The resulting data consisting of address data and command data is transmitted from the data processing computer 22 to the microcomputer 32 of the encoder 30, in real time, normally in response to the time of day clock 26. An indication of the data sent is also transferred to a printer 28 for logging purposes.

The microcomputer 32 of the encoder 30 may be implemented through the use of a commercially available microprocessor type 6502 and appropriate input/output interfaces, random access memory and erasable programmable read only memory, with programming for the microcomputer 32 residing in the erasable programmable read only memory. The microcomputer 32 converts the data received from the computer 22 into binary information consisting of a train of pulse width modulated pulses which are supplied to the video/data adder circuit 40 of the encoder 30. In addition to receiving and storing the data, the microcomputer 32 performs, as programmed, certain real-time encoder functions that normally would have required more hardware. Because of the way in which the microcomputer 32 is interfaced to the other encoder hardware, many of the characteristics of the encoded data, such as the type of pulse modulation used and the grouping and location of the address and command pulses in the television field, are defined by the programming of the microcomputer 32. In the present implementation, the data is encoded into six groups of pulse width modulated pulses as shown in FIG. 6A. Each group follows one of the six trailing equalizing pulses in the vertical interval.

In the pulse grouping format of FIG. 6A the first two groups identify an address of a regional uplink 50 or a local system 60. The remaining four groups of pulse data contain the command or information to be transmitted to the designated regional uplink 50 or local system 60.

The adder circuit 34 combines the data pulses with the incoming primary television video signal.

The primary video/data signal transmitted by the satellite 100 to the decoder 70 of a local system 60 is applied to the video/sync/data circuitry 72 in the decoder 70. The video/sync/data circuitry 72 in the decoder 70 is interfaced to microcomputer 80 which is typically represented as a commercially available microprocessor 6502A in combination with random access memory, erasable programmable read only memory, and appropriate input/output interfaces. Also an electrically erasable programmable read only memory 86 is interfaced to the microcomputer 80. Programming for the microcomputer 80 may be stored in either the erasable programmable read only memory or the electrically erasable programmable read only memory 86.

The address for the local system 60 may be set manually by the address switches 82. Additional address information may be stored in the memory 86. If the address pulse data of the data received by the decoder 70 corresponds to the local system address the microcomputer accepts the command pulse data for execution. In addition to executing the received commands, the microcomputer 80 performs, under program control, certain real-time data decoder functions that otherwise would have required implementation in hardware.

The video/sync/data circuitry 72 has the following functions. First, it acts as a conventional television sync separator, or sync clipper, supplying composite sync to the decoder microcomputer 80. Second, it separates the data from the primary video signal and passes the data to the microcomputer 80. And third, it deletes the data pulses from the video signal.

The separating of the data and the deleting of the data are each enabled by control signals supplied to the video/sync/data circuitry 72 by the microcomputer 80. The exact timing of these control signals relative to the primary video signal is computed by the microcomputer 80 using the separated composite sync as a reference. For this reason, the location(s) within the television field (usually somewhere in the vertical interval) at which the decoder attempts to decode data depends upon the programming of the microcomputer 80 and not upon the decoder hardware.

Data delete pulses supplied by the microcomputer 80 are used in the video/sync/data circuitry 72 to remove the data from the vertical blanking interval of the video signal. The video signal, absent the data pulses, is then made available for local use as well as being provided as one input to video/audio switcher 74.

The microcomputer 80 processes and evaluates the command data identified by the proper address and initiates the appropriate control output responses including selection of the appropriate video and audio programming supplied as inputs to the video/audio switcher 74. The sequence of video and audio programs transmitted from the video/audio switcher 74 in response to switcher control signals from the microcomputer 80 are supplied to the cable subscribers within the designated region.

By controlling the exact times at which commands to switch the video section of the video/audio switcher 74 are executed, the microcomputer 80 is able to provide vertical interval switching whenever switching from primary video to some other source. Switching during the vertical interval of the previous source minimizes the disturbance to the picture. The primary composite sync signal, already interfaced to the microcomputer 80 for data decoding reasons, provides the microcomputer 80 with the necessary timing information to accomplish this. When switching between input video signals not synchronous with each other, sync from the other input video signals would have to be interfaced to the microprocessor 80 in order to provide vertical interval switching in all directions.

The video/audio switcher 74 is a relay switcher. The relay coils are driven by drivers connected to parallel port output bits from the microprocessor 80. Small fast-acting relays are used. Relatively consistent relay turn-on and turn-off delays allow the microcomputer 80 to anticipate these delays when vertical interval switching is required.

In addition to the primary video signal input transmitted from the central facility 20, additional programming inputs to the video/audio switcher may be provided by the regional uplink stations 50 and numerous local programming sources. The microcomputer 80 is also programmed to respond to command pulse data to develop output signals to activate start/stop machine control relays 88 of video recorders, etc. Front panel light indicators 84 provide visual indication of the operational status of the decoder 70.

Assume for the purpose of discussion, that the implementation of the system 10 of FIG. 1 is a news network application wherein switching and time allocation is provided to accommodate both the primary news service from the central facility 20 as well as regional news services from one or more regional uplink stations 50 and numerous local program sources. A typical sequence implemented by the command data pulses inserted in the vertical blanking interval may be such that at approximately four minutes and forty seconds into the hour, a standby-to-power up signal is sent from the central facility 20 to the regional uplink stations 50 that are next in line for regional news transmission. Thirty seconds later, the signal to power up is given. Fifty seconds later, at six minutes after the hour, the decoders 70 are switched in response to command data pulses to their regional programming input and the regional uplink stations 50 are cued to start their programs. Shortly before the end of the current regional news feed, a standby signal is sent to the next group of regional uplink stations. At the end of the current regional news segment a command is sent to return all decoders 70 to a primary video news feed and a signal is given to the regional uplink stations 50 that have just completed their regional news program to power down. A signal is then sent for the next group of regional uplink stations 50 to power up. A similar sequence is repeated for the remaining regions.

Through the use of special commands, the programming for new type commands and other software changes can be transmitted and down-loaded to the electrically erasable programmable read only memory 86. This capability makes possible nearly instantaneous updating of the program memories in each of the regional decoders 70 from the central facility 20.

Figure 2:
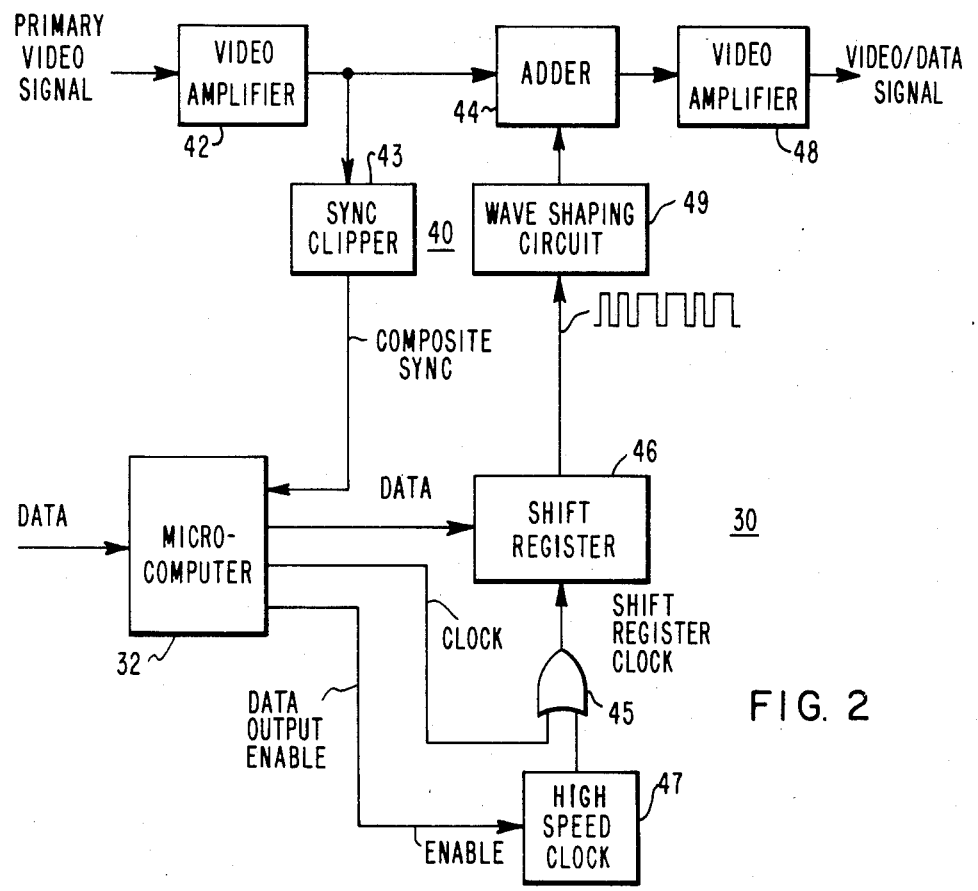
FIG. 2 is a block diagram schematic illustration of the encoder function of FIG. 1.

The encoder 30, as schematically illustrated in FIG. 2, consists basically of the microcomputer 32 and the video/data adder circuitry 40. The video/data adder circuitry 40 includes a video amplifier 42 which amplifies the incoming primary television video feed signal and supplies the resulting signal as an input to the sync clipper circuit 43 and to the adder circuit 44. Clock pulses from the microcomputer 32 act through OR gate 45 to enter the pulse width modulated command pulse data developed by the microcomputer 32 into the shift register 46.

The data and clock inputs to the shift register 46 of the encoder 30 are interfaced to the microcomputer 32 in a manner which allows the microcomputer 32 to load the shift register 46. The microcomputer preloads the shift register 46 with a bit pattern that exactly represents the waveform of the encoded signal that is to be combined with the video signal in the adder circuit 44. The resultant video/data signal is amplified by amplifier 48 and supplied to the satellite system 100. When the time to output the encoded signal occurs, the data output enable signal from the microcomputer 32 turns on the signal from a high speed clock oscillator 47 which, acting through the OR gate 45, shifts the signal waveform out of the shift register 46 at the proper rate. The microcomputer 32 can preload the shift register 46 at a relatively slow rate during the active picture portion of each field.

Assume for the purposes of discussion that microcomputer 32 is required to send the binary message 01 01 011 00 using an encoding scheme in which narrow pulses represent logic zeros and wide pulses represent logic ones. Programming in the microcomputer 32 will convert the data bit pattern of FIG. 4A to the shift register bit pattern or waveform of FIG. 4B. With each data bit, the microcomputer 32 flips the logic level sent to the shift register 46. The number of shift register bits used to represent a particular data bit determines its width and hence its encoded value. While in the waveform examples of FIGS. 4A and 4B, wide pulses are exactly twice the width of narrow pulses the only requirement is that there be an integer relationship between the wide and narrow pulses. The software of the microcomputer 32 further functions to determine how many pulses may be grouped together in a given time interval and ensures that each group of pulses begins and ends at the binary level corresponding to blanking.

When pulse data is to appear in multiple groups of pulses, with pauses between the groups to avoid interference with certain parts to the television waveform such as the equalizing pulses, the microcomputer 32 is programmed to provide contiguous "no signal" bits in the correct locations of the pulse waveform stored in the shift register 46. Accordingly, the groups of pulses, as well as the pauses between the groups of pulses, form a single waveform pattern that is preloaded into the shift register 46 from the microcomputer 32 and is subsequently clocked out of the shift register 46 when a data output enable signal is generated by the microcomputer 32.

The microcomputer 32 detects vertical sync in the composite sync signal supplied by the sync clipper circuit 43, delays a preprogrammed amount, then at the correct time outputs a data output enable control signal to turn on a stream of high speed data clock pulses from the clock circuit 47 which act through the OR gate 45 to clock the shift register 46. The high speed clock pulses clock the stored data waveform from the shift register 46 through the wave shaping circuit 49 to the adder circuit 44 wherein the pulse data is added linearly to the primary television video feed signal supplied to the adder circuit 44 by the video amplifier 42. The resultant combined video/data signal is then processed through video amplifier 48 and is available for transmission via the satellite 100 to remote decoders in the regional uplink stations 50 and the local television subscriber systems 60.

Thus the microcomputer 32 loads the shift register 46 at a relatively slow rate with the binary information ones and zeros which eventually serve as the command pulse data to be added to the television signal. With reference to the composite sync signal from the sync clipper 43, when correct timing within the vertical blanking interval of the primary television video feed has been detected by the microcomputer 32, the microcomputer 32 causes the data to be clocked from the shift register 46 at a steady high speed rate in response to the clock pulses from the clock circuit 47. The data stored in the shift register 46 is the waveform developed by the microcomputer 32 in response to the binary ones and zeros of the instructions received from computer 22. Thus the data clocked into the shift register 46 from the microcomputer 32 does not consist of ones and zeros but a pulse width modulated waveform representing the binary data generated by the computer 22.

The wave shaping circuit 49 serves to control the pulse rise and fall times as well as the shape of the pulses. The adder 44 is an analog circuit which linearly adds the pulses to the video.

Figure 3:
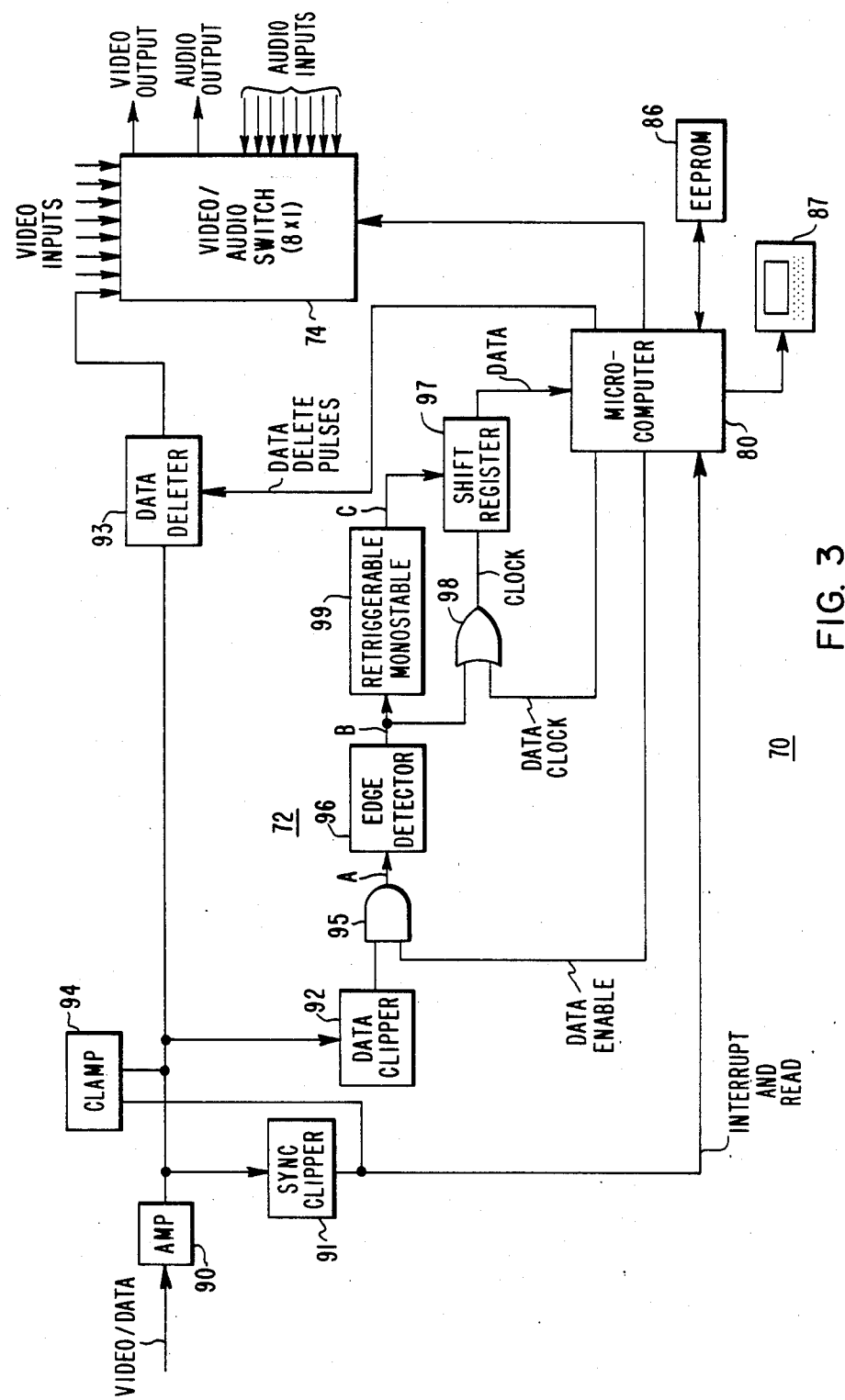
FIG. 3 is a block diagram schematic illustration of the decoder function of FIG. 1.

Referring to FIG. 3 there is illustrated a block diagram schematic of the decoder 70 which details an implementation of the video/data separator 72 as it functionally interfaces with the video/audio switcher 74 and microcomputer 80. The primary video/data signal transmitted from the central facility 20 via the satellite 100, and shown in the waveform of FIG. 6A, is received by the decoder 70 as an input to the amplifier circuit 90. The amplified video/data signal is supplied as an input to the sync clipper circuit 91, the data clipper circuit 92 and the data deleter circuit 93. An active clamp circuit 94 is required to maintain the d-c level of the video/data signal to assure consistent signal level for the removal of the pulse data information and the insertion of the correct blanking level. The sync clipper 91 functions to strip the composite sync signal from the video/data signal and the resulting composite sync signal is supplied as an interrupt and read signal to the microcomputer 80. The software of the microcomputer 80 recognizes the presence of a valid vertical sync pulse, delays for an appropriate interval, and then generates a data enable pulse, to effect the gating of the pulse data from the data clipper circuit 92 through the AND gate 95 to the edge detector circuit 96. Inasmuch as the rate at which the data is decoded exceeds the reading speed of the microcomputer 80, the data is supplied to the shift register 97. The data clipper circuit 92 is adjusted to clip the video signal at some predetermined level between the extremes of the data pulses. The timing of the data enable pulse ensures that the information provided to the shift register 97 is only data and does not include transitions due to data clipper 92 clipping of other features of the video/data waveform.

The waveform of the information supplied at the input signal to the edge detector circuit 96 is illustrated as the waveform of FIG. 5A. The edge detector circuit 96 is responsive to the edges, i.e. the rising and falling transitions in the waveform of FIG. 5A, and generates a pulse for every transition. The width of the pulse developed by the edge detector circuit 96 is relatively small as shown in the waveform of FIG. 5B. It is the output of the edge detector circuit 96 that is used for data decoding. The purpose of the decoder 70 is to discriminate between the "wides" and "narrows" of the pulse width modulated data transmitted in the vertical blanking interval of the video/data signal and received by the amplifier 90, and to represent the "wides" and "narrows" in a pattern of logic ones and zeros. Here the terms "wides" and "narrows" refer to the relative amounts of time between successive transitions in the encoded data waveform. The output of the edge detector 96, acting through OR gate 98, clocks or shifts, by one shift register bit position, each successive value of the decoded data into the shift register 97. One bit of decoded data is stored in the shift register 97 for each transition in the transmitted pulse waveform.

The data input to the shift register 97 corresponds to the output of the retriggerable monostable pulse generator circuit 99 which is triggered by the edge pulse output of the edge detector circuit 96. The period of the monostable pulse generator circuit 99 is established between Tn, the duration of a "narrow", and Tw, the duration of a "wide". If after the retriggerable monostable 99 is triggered by an edge pulse, a second edge pulse occurs at time Tn, the output of the monostable 99 will still be asserted at the time of the second edge pulse. On the other hand, if after the retriggerable monostable 99 is triggered by an edge pulse, a second edge pulse occurs at time Tw, corresponding to a "wide" time, the monostable will have timed-out and returned to its off state prior to the occurrence of this second pulse. Thus, referring to the waveform of FIG. 5C, which corresponds to the output of circuit 99, the output of the retriggerable monostable pulse generator circuit 99 will be high or low depending upon the time interval between successive edge pulses. Hence each edge pulse will clock through the shift register 97 a data value corresponding either to a logic one or a logic zero depending on the amount of time that has elapsed between successive pulses supplied to the circuit 99.

The waveform of FIG. 5A is the encoded data signal which, when applied to the edge detector circuit 96 of FIG. 3, results in a pulse output waveform of relatively narrow pulses as shown in the waveform of FIG. 5B. This corresponds to each transition in the waveform of FIG. 5A. In the waveform of FIG. 5B the encoded digital information resides in the timing between successive pulses. Hence the output of the monostable circuit 99, which is represented by the waveform of FIG. 5C, is the decoded data output.

Since the same pulse output of the edge detector 96 is used both to trigger the monostable circuit 99 and to clock the shift register 97, circuit delays should be made such that the output is read before the resetting effect of triggering the monostable circuit 99 is able to appear at the output. Where normal circuit propagation times do not provide delays, a small amount of time delay can be added anywhere in the signal path of the monostable.

Correct timing also can be achieved without resorting to added delay circuitry by taking advantage of the small finite width of the edge pulses themselves. Reading of the monostable 99 output may be performed on the leading edges of the pulses of the waveform of FIG. 5B while triggering of the monostable 99 may be made to occur in response to the trailing edges.

The microcomputer 80 has a control line which is also capable of clocking the shift register 97. The data clock signal from the microcomputer 80 is transmitted to the shift register 97 through the OR gate 98 and causes the data bits stored in the shift register 97 to be transferred to the microcomputer 80 at the rate which is compatible with the data processing capabilities of the microcomputer 80. The microcomputer 80 performs parity operations on the data and checks the address. If the address of the data corresponds to the local system address the microcomputer 80 formats the data into a recognizable format and stores the data in memory. The data received may be command pulse data for controlling the video/audio switcher 74 or it may consist of software program changes which are to be downloaded in memory. Updated software information may be down-loaded to the electrically erasable programmable read only memory 86. The data may also be text material to be displayed on a local monitor 87 to provide information and instruction to personnel located at the receive location 60.

A train of data delete pulses as shown in the waveform of FIG. 6B is transmitted from the microcomputer 80 to the data delete circuit 93. The data delete circuit 93 removes the data pulses from the waveform of FIG. 6A and produces an output primary video signal, absent the data pulses, as shown in the waveform of FIG. 6C. The action of the data delete circuit 93 restores the vertical interval of the primary video signal to normal prior to providing the primary video signal as an input to the video/audio switcher 74.

The data delete pulses are each initiated by the microcomputer 80 slightly before each burst of data pulses and are each terminated before the next equalizing pulse occurs so that the data pulses are deleted and the equalizing pulses are not.

For the type of pulse width modulation used, the time required to transmit a message containing a fixed number of bits will depend upon the content of the message, that is, upon the fraction of those bits that are represented by "wides" rather than by "narrows". The worst case message would consist entirely of "wides". In order to improve the efficiency of data transmission, a pulse data format has been chosen such that the pulses representing a given message conform to one of two possible conventions. For a given binary message from the computer 22 "wides" may represent either logical ones or logical zeros, depending on the ones count in the binary message. For example, if the binary data received from the computer 22 consists of a majority of logic ones then "narrows" will be assigned to the logic one content of the input binary data and "wides" will be assigned to logic zeros. Conversely, if logic zeros represent the majority of the binary data received from computer 22, the encoder 30 will assign "narrows" to the logic zero binary information and "wides" to the logic one binary information. In this manner more efficient transmission is achieved by predetermining that, for any message, the number of "wides" will never exceed the number of "narrows". The terms "wides" and "narrows" refer to the durations between successive transitions, described above with reference to the waveform of FIG. 5A.

A mode bit somewhere in the transmission defines for the decoder which convention is being used. While the mode bit may occur at any point in the transmitted pulse data, it is assumed for the purpose of discussion that the mode bit is the first bit in each transmitted data message.

The microcomputer 32 of the encoder 30 takes the binary data message which is to be added to the television video signal and counts up all the logic zeros and logic ones and assigns the "narrows" to represent the logic level which appears most often in the message and indicates this with a mode bit. If the mode bit is a "wide" then the "wides" of the data message are logic zeros. The conversion of the binary data message is a software function of the microcomputer 32.

The microcomputer 80 in the decoder 70 receives the series of ones and zeros from the shift register 97 and responds to the mode bit to interpret the logic one and zero content of the message.

While the software of the microcomputer can prevent the computer from misinterpreting spaces between predetermined groups of data pulses as "data" it may be desirable to include circuitry to effect this function in the event the number of pulses may vary from group to group. This function can be realized through the use of a monostable triggered by the edge detector 96 and designed to time out at a time duration greater than the "wide" pulse and less than the space between groups of pulses. This time out action would terminate the clocking of the shift register 97.

I claim:

1. In a satellite communications network, the combination of,
a central uplinking facility for transmitting primary video signals of a primary video program to a satellite said primary video signals including data inserted in a non-video portion of the signals, said data including address identification and command information,
a plurality of local television systems,
a satellite means having a plurality of transponders to receive at least said transmitted primary video signals and transmit the primary video signals to said local television systems,
each of said local television systems including:
one or more sources for generating non-satellite video signals corresponding to non-satellite video programs,
a video decoder means for separating said data from the primary video signals and providing said data and said primary video signals without the data as separate data output signals and primary video output signals,
a video switching means having a plurality of video program inputs and a video program output, said primary video output signals of said video decoder means being one input, said non-satellite video signals being additional inputs, and
a computer means having a preset address identification and responding to data output signals from the video decoder means which have the same address by transmitting control signals to said video switching means to develop local television system programming corresponding to the video program output of said video switching means, said local television system programming comprised of one or more of said video program inputs as determined by said command information.

2. In a communication system for making available both satellite and non-satellite video programs to one or more local television systems wherein said satellite video programs include at least a primary video program having primary video signals having data inserted in a non-video portion of the primary video signals, said data including address and command information, the combination of
at least one local television system including:
a video decoder means for accepting said primary video signals and separating said data from the primary video signals and providing said data and said primary video signals without the data as separate output signals,
a source of one or more non-satellite video programs,
a video switching means having a plurality of video program inputs and a video program output, satellite video programs, including said primary video output signals of said video decoder means and said non-satellite video programs being video program inputs to said video switching means, and
a computer means having a specific address identification and responding to data output signals from the video decoder means which have the same address by transmitting control signals consistent with said command information to said video switching means to develop a local television system program comprised of one or more of said satellite and non-satellite programs as determined by said command information.

3. In a satellite network as claimed in claim 2 wherein said data inserted in the non-video portion of the television video signal comprise a pulse width modulated waveform wherein data bits are represented by the time duration between successive pulse transitions with time durations greater than a predetermined reference duration representing a first binary value and time durations less than the predetermined reference duration representing a second binary value, said video decoder means including a retriggerable monostable pulse generator of a pluse width duration corresponding to said predetermined reference duration, an edge pulse generator responding to the data bits of the pulse width modulated waveform by developing an output for triggering said retriggerable monostable pulse generator means, the output of said retriggerable monostable pulse generator means representing the data output signals provided to said computer means.

4. In the satellite network as claimed in claim 3 further including a shift register means coupling said data output signals from said retriggerable monostable pulse generator means to said computer means, said shift register means storing said data output signals for access by the computer means, said computer means enabling the clocking of data output signals from said retriggerable monostable pulse generator means into said shift register means.

5. In a satellite network as claimed in claim 2 wherein said video decoder means includes a data delete means having as an input the primary video signals consisting of the video signals and the data inserted in the non-video portion of the video signals, said computer means developing data delete pulses for removing the data from said video signals to produce said primary video signals without said data.

6. In a communication system for making available satellite video programs to one or more local television systems wherein one of said satellite video programs is a primary video program having primary video signals having data inserted in a non-video portion of the primary video signals, said data including address and command information, the combination of
at least one local television system including:
a video decoder means for accepting said primary video signals and separating said data from the primary video signals and providing said data and said primary video signals without the data as separate output signals,
a video switching means having a plurality of video program inputs and a video program output, said primary video output signals of said video decoder means and the non-primary satellite video programs being video program inputs to said video switching means, and
a control means having a preset address identification and responding to data output signals from the video decoder means which have the same address by transmitting control signals consistent with said command information to said video switching means to develop local television system programming comprised selectively of one or more of said video program inputs as determined by said command information.

7. In a satellite communications network, the combination of,
a central uplinking facility for transmitting primary video signals of a primary video program to a satellite, said video signals including data inserted in a non-video portion of the video signals, said data including address identification and command information,
one or more local television systems,
a satellite means having one or more transponders to receive said primary video signals from said central uplinking facility and transmit said primary video signals to one or more of said local television systems,
said one or more local television systems including:
a video decoder means for separating said data from the primary video signals and providing said data, and said video signals without said data, as separate data output signals and video output signals respectively,
a switching means having a plurality of program inputs and a program output, said primary video output signals from said video decoder means being one program input,
one or more additional program sources for providing additional program inputs to said switching means, and
computer means responding to said data output signals from said video decoder means to develop a local television system program comprised of one or more of said program inputs as determined by the command information of said data output signal.

8. In a satellite network as claimed in claim 7 wherein said data output signals supplied by said video decoder means to said computer means may comprise commands to control the sequential selection of program inputs to serve as the program output from said switching means; information for updating the stored program of the computer means, or operator instruction information for visual display at the local television system.

9. In a satellite network as claimed in claim 7 wherein said data inserted in the non-video portion of the primary video signal comprise a pulse width modulated waveform wherein data bits are represented by the time duration between successive pulse transitions with time durations greater than a predetermined reference duration representing a first binary value and time durations less than the predetermined reference duration representing a second binary value, said video decoder means including a retriggerable monostable pulse generator of a pulse width duration corresponding to said predetermined reference duration, an edge pulse generator responding to the data bits of the pulse width modulated waveform by developing an output for triggering said retriggerable monostable pulse generator means, the output of said retriggerable monostable pulse generator means representing the data output signals provided to said computer means.

10. In the satellite network as claimed in claim 9 further including a shift register means coupling said data output signals from said retriggerable monostable pulse generator means to said computer means, said shift register means storing said data output signals for access by the computer means, said computer means enabling the clocking of data output signals from said retriggerable monostable pulse generator means into said shift register means.

11. In a satellite network as claimed in claim 7 wherein said video decoder means includes a data delete means having as an input the primary video signals consisting of the video signals and the data inserted in the non-video portion of the video signals, said computer means developing data delete pulses for removing the data from said video signals to produce said television video signals without said data.

12. In a satellite communications network, the combination of,
a central uplinking facility for transmitting primary video signals of a primary video program to a satellite, said video signals including data inserted in a non-video portion of the video signals, said data including address identification and command information,
one or more local television systems, a satellite means having one or more transponders to receive said primary video signals from said central uplinking facility and transmit said primary video signals to one or more of said local television systems, said one or more local television systems including:

a video decoder means for separating said data from the primary video signals and providing said data and said video signals without said data as separate data output signals and video output signals, respectively, comptuer means operatively connected to said video decoder means for responding to data output signals having a predetermined address identification by generating output signals corresponding to the command information of said data output signals for controlling the operation of said local television system, and one or more local video programming sources including a video record-playback system, said computer means controlling the operation of said video record-playback system in response to command information of said data output signals from said video decoder means.

13. In a satelitte network as claimed in claim 12 wherein said video recorder-playback system records said video output signals of said video decoder means in response to output signals from said computer means.

14. A communication system for constructing local television programs for one or more local television systems by selectively switching among satellite program sources in response to command information, comprising, a central uplinking facility for transmitting primary video signals to a satellite, said primary video signals including data inserted in a non-video portion of the signals, said data including address identification and command information, a satellite means having a plurality of transponders for receiving set primary video signals in one or more satellite video programs, one or more additional uplinking facilities for transmitting said one or more satellite video programs to said satellite means, one or more local television systems, each of said local television systems including:

a video decoder means for separating said data from the primary video signals and providing said data and said primary video signals without the data as separate data output signals and primary video output signals, a video switching means having a plurality of video inputs and a program output, said primary video output signals of said video decoder means being one input, said one or more satellite video programs being one or more additional inputs, and computer means for responding to the data of said primary video signals identified by a predetermined address by generating output signals corresponding to command information of said data to develop local television system programming comprised selectively of one or more of said satellite video programs as determined by said command information.

15. In a satellite network as claimed in claim 14 further including one or more sources for generating non-satellite video programs, said computer means transmitting control signals to said video switching means to develop local television system programming comprised selectively of one or more of said video inputs as determined by said command information.

16. In a satellite network as claimed in claim 14 wherein said data inserted in the non-video portion of the television video signal comprise a pulse width modulated waveform wherein data bits are represented by the time duration between successive pulse transitions with time durations greater than a predetermined reference duration representing a first binary value and time durations less than the predetermined reference duration representing a second binary value, said video decoder means including a retriggerable monostable pulse generator of a pulse width duration corresponding to said predetermined reference duration, an edge pulse generator responding to the data bits of the pulse width modulated waveform by developing an output for triggering said retriggerable monostable pulse generator means, the output of said retriggerable monostable pulse generator means representing the data output signals provided to said computer means.

17. In the satellite network as claimed in claim 16 further including a shift register means coupling said data output signals from said retriggerable monostable pulse generator means to said computer means, said shift register means storing said data output signals for access by the computer means, said computer means enabling the clocking of data output signals from said retriggerable monostable pulse generator means into said shift register means.

18. In a satellite network as claimed in claim 14 wherein said video decoder means includes a data delete means having as an input the television video signals consisting of the video signals and the data inserted in the non-video portion of the video signals, said computer means developing data delete pulses for removing the data from said video signals to produce said television video signals without said data.

19. A satellite network for constructing programming for one or more local television systems by selectively switching among satellite video programs in response to command information, comprising, a first uplinking facility for transmitting data including address identification and command information, said data being inserted in a non-video portion of primary video signals of a primary video program transmitted from said first uplinking facility, a satellite means having a plurality of transponders for receiving said primary video program and one or more satellite video programs, one or more additional uplinking facilities for transmitting said one or more satellite video programs to said satellite means, one or more local television systems, each local television system including:

means for accessing said primary video program and said satellite video programs from said satellite means, video decoder means for separating said data from said primary video signals and providing said data and said primary video signals without said data as separate data signals and primary video output signals, one or more non-satellite sources for generating video programs, a video switching means having a plurality of video inputs and a program output, said primary video output signals of said video decoder means being one input, said satellite and non-satellite video programs being additional inputs, and control means for responding to said data output signals identified by a predetermined address for controlling said video switching means to develop local television system programming comprised of one or more of the video inputs of said video switching means.

20. In a satellite network as claimed in claim 19 wherein said data inserted in the non-video portion of the television video signal comprise a pluse width modulated waveform wherein data bits are represented by the time duration between successive pulse transitions with time durations greater than a predetermined reference duration representing a first binary value and time durations less than the predetermined reference duration representing a second binary value, said video decoder means including a retriggerable monostable pulse generator of a pulse width duration corresponding to said predetermined reference duration, an edge pulse generator responding to the data bits of the pulse width modulated waveform by developing an output for triggering said retriggerable monostable pulse generator means, the output of said retriggerable monostable pulse generator means representing the data output signals provided to said control means.

* * * * *